(12) United States Patent
Zhang

(10) Patent No.: US 12,426,760 B2
(45) Date of Patent: Sep. 30, 2025

(54) CLEANING METHOD, CLEANING ROBOT AND COMPUTER-READABLE STORAGE MEDIUM

(71) Applicant: Yunjing Intelligence (Shenzhen) Co., Ltd., Shenzhen (CN)

(72) Inventor: Junbin Zhang, Shenzhen (CN)

(73) Assignee: Yunjing Intelligence (Shenzhen) Co., Ltd., Shenzhen (CN)

( * ) Notice: Subject to any disclaimer, the term of this patent is extended or adjusted under 35 U.S.C. 154(b) by 576 days.

(21) Appl. No.: 17/545,842

(22) Filed: Dec. 8, 2021

(65) Prior Publication Data

US 2022/0183528 A1 Jun. 16, 2022

(30) Foreign Application Priority Data

Dec. 10, 2020 (CN) .......................... 202011437304.6

(51) Int. Cl.
| | | |
|---|---|---|
| *A47L 11/40* | (2006.01) | |
| *A47L 11/24* | (2006.01) | |
| *A47L 11/28* | (2006.01) | |
| *A47L 11/282* | (2006.01) | |
| *G05D 1/00* | (2024.01) | |

(52) U.S. Cl.
CPC .......... *A47L 11/4061* (2013.01); *A47L 11/24* (2013.01); *A47L 11/28* (2013.01); *A47L 11/282* (2013.01); *A47L 11/4011* (2013.01); *A47L 11/4066* (2013.01); *G05D 1/0214* (2013.01); *G05D 1/0219* (2013.01); *A47L 2201/04* (2013.01)

(58) Field of Classification Search
CPC ........ A47L 11/24; A47L 11/28; A47L 11/282; A47L 11/4011; A47L 11/4036; A47L 11/4038; A47L 11/4061; A47L 11/4066; A47L 2201/04; A47L 9/2852; A47L 11/4002; A47L 2201/06; G05D 1/0214; G05D 1/0219; B25J 11/0085; B25J 9/1664

See application file for complete search history.

(56) References Cited

U.S. PATENT DOCUMENTS

| | | |
|---|---|---|
| 7,155,308 B2 | 12/2006 | Jones |
| 2011/0226282 A1 | 9/2011 | Choi et al. |
| 2017/0071435 A1* | 3/2017 | Jeong ................. A47L 11/4008 |

(Continued)

FOREIGN PATENT DOCUMENTS

| | | |
|---|---|---|
| CN | 1423025 A | 6/2003 |
| CN | 204016192 U | 12/2014 |
| CN | 106575123 A | 4/2017 |

(Continued)

OTHER PUBLICATIONS

Machine translation of KR2007-0106864A (Year: 2007).*

(Continued)

*Primary Examiner* — Douglas Lee
(74) *Attorney, Agent, or Firm* — Leydig, Voit & Mayer, Ltd.

(57) ABSTRACT

A cleaning method of a cleaning robot includes, when the cleaning robot travels along an obstacle, driving a rear end of the cleaning robot, on which a cleaning member is arranged, to make multiple turning motions towards the obstacle and multiple backswings away from the obstacle, thereby cleaning a blind zone of the cleaning robot relative to the obstacle. In such a way, blind zones are cleaned when cleaning along obstacles.

19 Claims, 8 Drawing Sheets

(56) References Cited

U.S. PATENT DOCUMENTS

2019/0038105 A1* 2/2019 Park .................. A47L 9/28

FOREIGN PATENT DOCUMENTS

| | | |
|---|---|---|
| CN | 108209744 A | 6/2018 |
| CN | 109512344 A | 3/2019 |
| CN | 109567678 A | 4/2019 |
| CN | 109730587 A | 5/2019 |
| CN | 110507238 A | 11/2019 |
| CN | 110580047 A | 12/2019 |
| CN | 110680253 A | 1/2020 |
| CN | 110989621 A | 4/2020 |
| CN | 111918593 A | 11/2020 |
| CN | 112603203 A | 4/2021 |
| EP | 3187956 A1 | 7/2017 |
| JP | 62154008 A | 7/1987 |
| JP | 201580560 A | 4/2015 |
| JP | 2019201754 A | 11/2019 |
| KR | 20070106864 A * | 11/2007 |
| KR | 1020070106864 A | 11/2007 |
| KR | 1020160055233 A | 5/2016 |
| TW | 201545699 A | 12/2015 |
| WO | 2018012915 A1 | 1/2018 |

OTHER PUBLICATIONS

Chinese Patent Office, First Office Action in Chinese Patent Application No. 202011437304.6 (Sep. 17, 2021).
Chinese Patent Office, Second Office Action in Chinese Patent Application No. 202011437304.6 (Jun. 6, 2022).
European Patent Office, European Search Report in European Patent Application No. 21213204.7 (May 13, 2022).
Patent Cooperation Treaty, International Search Report, International Application No. PCT/CN2021/136678 (Feb. 28, 2022).

* cited by examiner

CLEANING METHOD, CLEANING ROBOT AND COMPUTER-READABLE STORAGE MEDIUM

RELATED APPLICATIONS

This application claims the benefit of priority to Chinese application No. 202011437304.6 filed on Dec. 10, 2020, which is hereby incorporated by reference in its entirety.

FIELD

The present disclosure relates to the technical field of cleaning robots, and in particular, to a cleaning method, a cleaning robot and a computer readable storage medium.

BACKGROUND

Referring to FIGS. 1 and 2, in related arts, a cleaning robot includes a sweeping module 11 arranged at the bottom front end of the cleaning robot and a mopping module 12 arranged at the bottom rear end of the cleaning robot. In the process of cleaning along an edge according to the conventional edge travelling direction, a blind zone is formed between the cleaning member of the mopping module 12 and the obstacle, and thus, cannot be cleaned, which will affect the cleaning effect of the cleaning robot.

SUMMARY

The present disclosure provides a solution, when cleaning along an edge of an obstacle, when a blind zone is formed between the cleaning member at the rear end of the cleaning robot and the obstacle, and thus, cannot be cleaned.

A first aspect of the present disclosure provides a cleaning method of a cleaning robot. The cleaning method includes, when the cleaning robot travels along an obstacle, driving a rear end of the cleaning robot on which a cleaning member is arranged to make multiple turning motions towards the obstacle and multiple backswings away from the obstacle, thereby cleaning a blind zone of the cleaning robot relative to the obstacle.

In an exemplary embodiment, the cleaning method further includes controlling a current cleaning zone cleaned in each current turning motion to be partially overlapped with or adjacent to a previous cleaning zone cleaned in a previous turning motion.

In an exemplary embodiment, the cleaning method further includes driving the rear end of the cleaning robot to make the turning motions towards the obstacle if a constraint condition of traveling along the obstacle is satisfied.

In an exemplary embodiment, the constraint condition of traveling along the obstacle comprises: a distance between the cleaning robot and the obstacle detected in real time being equal to a preset distance threshold or falling within a preset distance interval.

In an exemplary embodiment, the cleaning method further includes driving the rear end of the cleaning robot to make the turning motions towards the obstacle when the cleaning robot stops travelling.

In an exemplary embodiment, the cleaning method further includes controlling a current cleaning zone in each current turning motion to be partially overlapped with or adjacent to a previous cleaning zone in a previous backswing.

In an exemplary embodiment, the cleaning method further includes driving the rear end of the cleaning robot to start the turning motions towards the obstacle, along an initial travelling direction of the cleaning robot along the obstacle, and driving the rear end of the cleaning robot to make backswings back to the initial travelling direction or a previous position.

In an exemplary embodiment, the turning motions and the backswings are made during continuous travelling of the cleaning robot.

In an exemplary embodiment, the cleaning robot travels in a wave style or a zigzag style.

A second aspect of the present disclosure provides a cleaning method of a cleaning robot. The cleaning method includes stopping travelling of the cleaning robot along an obstacle and driving a rear end of the cleaning robot on which a cleaning member is arranged to make a turning motion towards the obstacle, driving the rear end of the cleaning robot to make a backswing from a previous turning position, and restarting the travelling of the cleaning robot along the obstacle with a first distance.

In an exemplary embodiment, the cleaning method further includes controlling a current cleaning zone cleaned in each current turning motion to be partially overlapped with or adjacent to a previous cleaning zone cleaned in a previous turning motion.

In an exemplary embodiment, the cleaning method further includes, when the cleaning robot turns along the obstacle, adjusting the first distance and the number of turning motions according to a turning radius of the cleaning robot along the obstacle.

In an exemplary embodiment, when the turning radius of the cleaning robot along the obstacle is small, the first distance traveled by the cleaning robot is large, and the number of turning motions is small.

In an exemplary embodiment, when the turning radius of the cleaning robot along the obstacle is small, the first distance traveled by the cleaning robot is small, and the number of turning motions is large.

A third aspect of the present disclosure provides a cleaning method of a cleaning robot. The cleaning method includes, when the cleaning robot continuously travels along an obstacle, driving a rear end of the cleaning robot on which a cleaning member is arranged to make multiple turning motions towards the obstacle and multiple backswings away from the obstacle, controlling a current cleaning zone cleaned in each current turning motion or each backswing to be partially overlapped with or adjacent to a previous cleaning zone cleaned in a previous turning motion or a previous backswing, and, when each turning cleaning cycle is completed, controlling the cleaning robot to travel a first distance along the obstacle.

In an exemplary embodiment, the cleaning method further includes, when the cleaning robot turns along the obstacle, adjusting the first distance and the numbers of turning motions according to a turning radius of the cleaning robot along the obstacle.

In an exemplary embodiment, when the turning radius of the cleaning robot along the obstacle is small, the first distance traveled by the cleaning robot is large, and the number of turning motions is small.

In an exemplary embodiment, when the turning radius of the cleaning robot along the obstacle is small, the first distance traveled by the cleaning robot is small, and the number of turning motions is large.

A fourth aspect of the present disclosure provides a cleaning robot. The cleaning robot includes a processor and a memory. The processor is in communication with the memory, the memory is configured to store instructions, and the processor is configured to implement a cleaning method by executing the instructions.

A fifth aspect of the present disclosure provides a computer readable storage medium adapted for a cleaning robot, in which the computer readable storage medium includes instructions, and the cleaning robot is configured to implement a cleaning method by executing the instructions.

During the edge traveling of the cleaning robot along an edge of an obstacle, the rear end of the cleaning robot in the present disclosure can make a plurality of turning motions and backswings so that the cleaning member can reach to and clean the blind zone. Thereby, blind zones are cleaned when cleaning along obstacles, and the cleaning effect of the cleaning robot is improved.

BRIEF DESCRIPTION OF THE DRAWINGS

The accompanying drawings facilitate an understanding of various embodiments of this disclosure. In such drawings.

DETAILED DESCRIPTION OF EMBODIMENTS

The described embodiments are only illustrations of the present disclosure, and do not describe all possible embodiments. The following description of at least one exemplary embodiment therefore shall not be construed as a limitation to the present disclosure or its application or use. Based on embodiments of the present disclosure, all other embodiments obtained by a person ordinarily skilled in the art without carrying out creative work shall fall within the scope of the present disclosure and claims.

Embodiment One

FIGS. 3-7 respectively show a schematic diagram when a cleaning robot linearly or nonlinearly travels along an obstacle. In a travelling process of the cleaning robot, a cleaning method according to the present disclosure can be applied.

Figure 1:
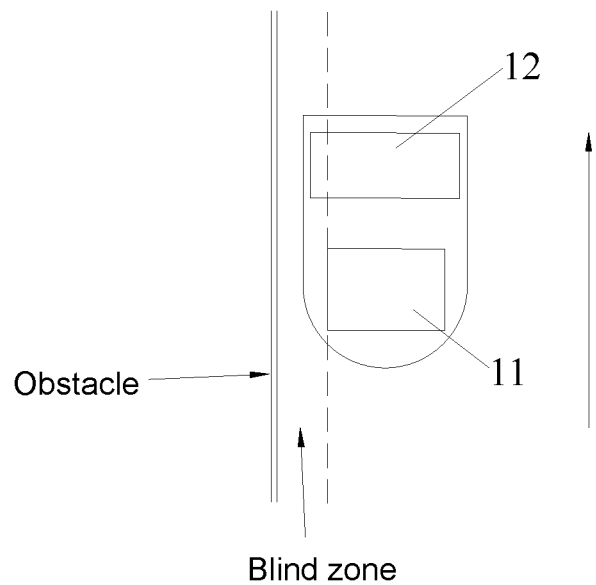
FIG. 1 is a schematic diagram showing when a cleaning robot linearly travels along an obstacle in related arts.
Figure 2:
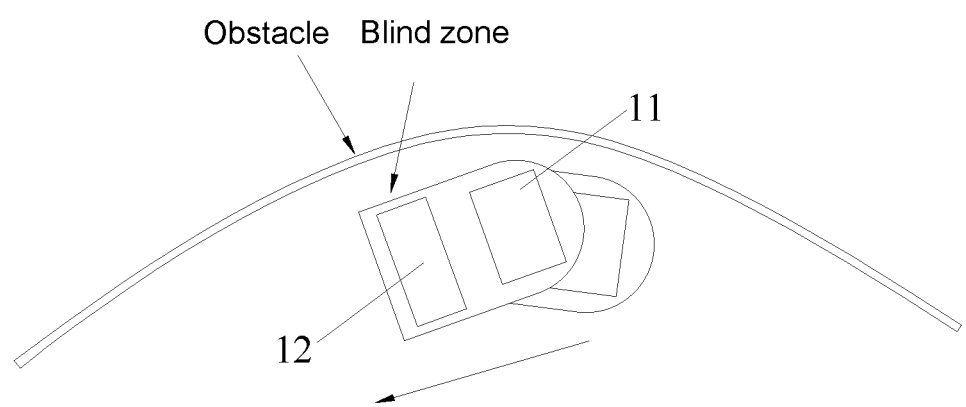
FIG. 2 is a schematic diagram showing when a cleaning robot nonlinearly travels along an obstacle in related arts.
Figure 3:
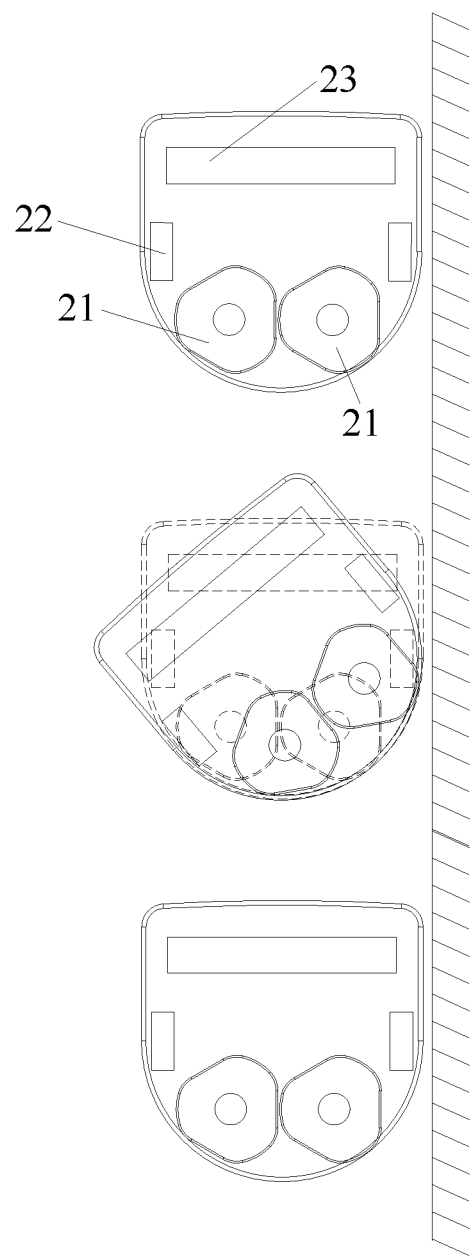
FIG. 3 is a schematic diagram showing that a cleaning robot linearly travels along an obstacle according to an embodiment of the present disclosure.
Figure 4:
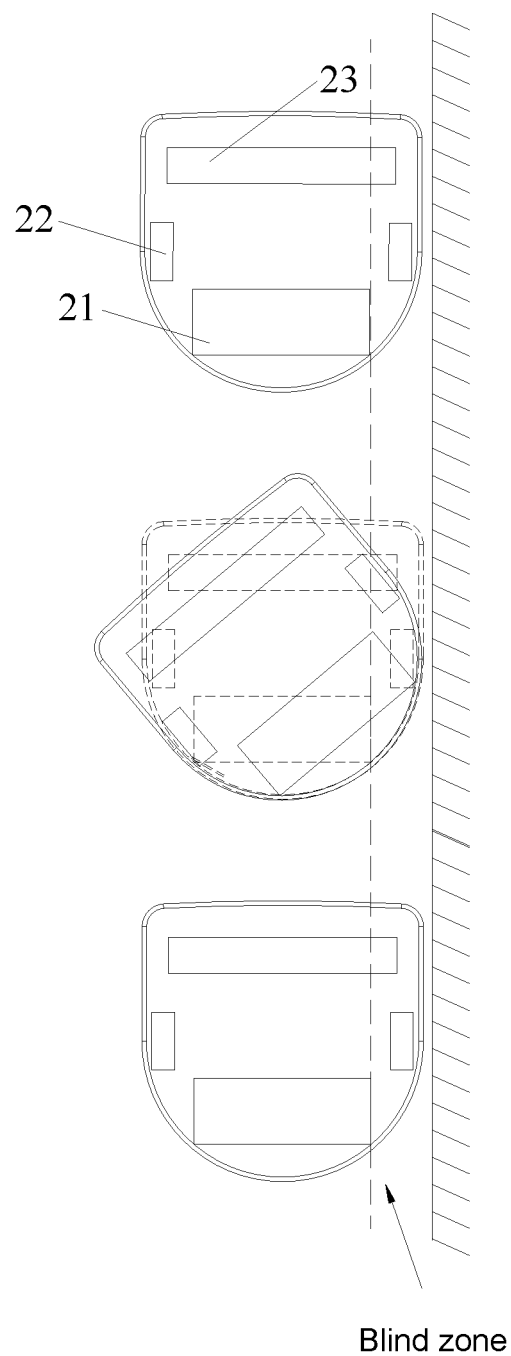
FIG. 4 is a schematic diagram showing that a cleaning robot linearly travels along an obstacle according to another embodiment of the present disclosure.
Figure 5:
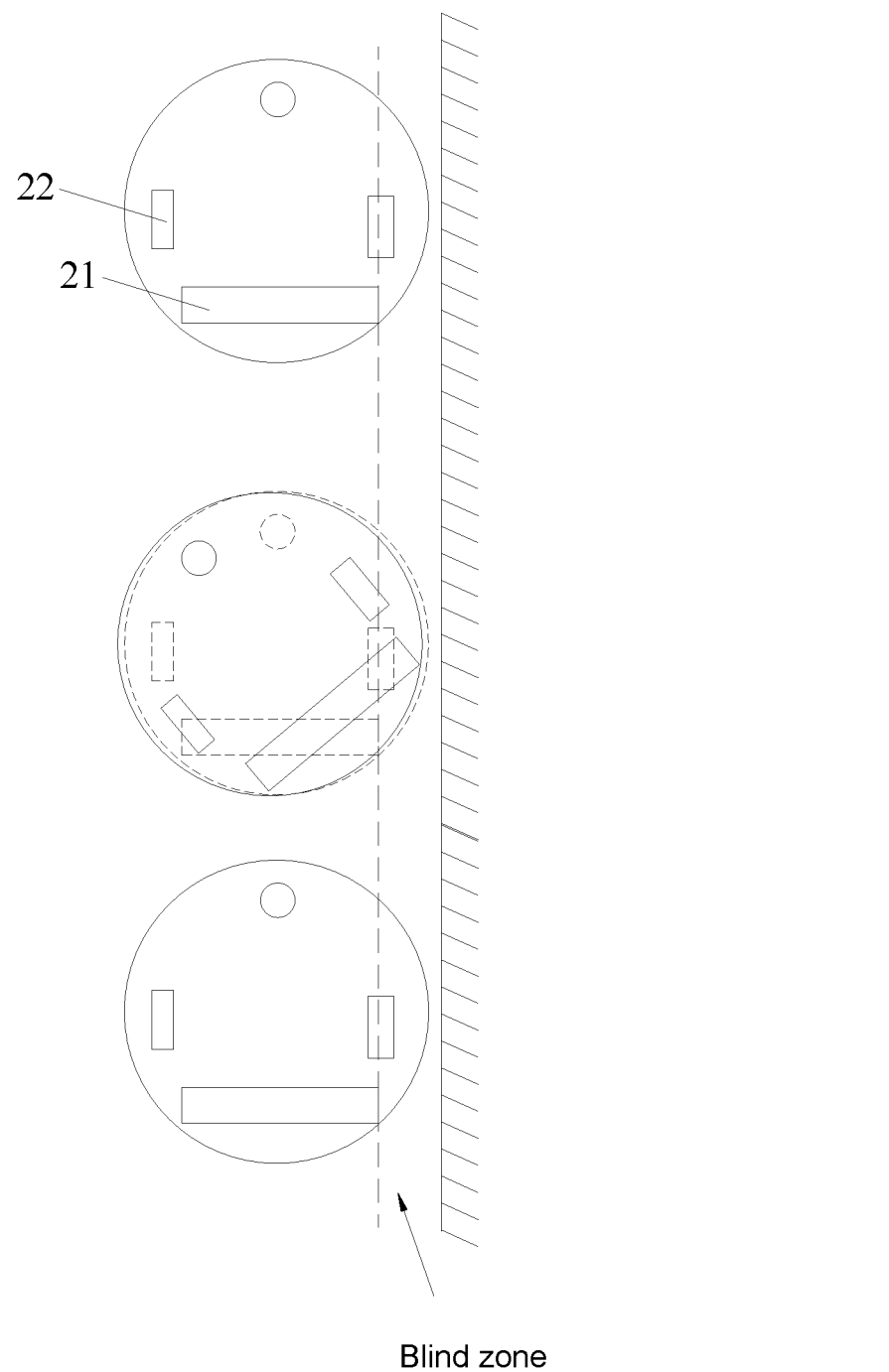
FIG. 5 is a schematic diagram showing that a cleaning robot linearly travels along an obstacle according to still another embodiment of the present disclosure.

Referring to FIGS. 3-7, the present disclosure discloses a cleaning method of a cleaning robot, and the cleaning robot includes a cleaning member 21 arranged at a rear end of the cleaning robot. The cleaning method includes: when the cleaning robot travels along an obstacle, driving the rear end of the cleaning robot to make multiple turning motions towards the obstacle (as shown in FIGS. 3-5) and multiple backswings away from the obstacle, thereby cleaning a blind zone of the cleaning robot relative to the obstacle. In the present disclosure, an end of the cleaning robot following behind the travelling of the cleaning robot is defined as a rear end of the cleaning robot.

The cleaning robot of the present disclosure can make multiple turning motions of the rear end of the cleaning robot so as to reach to and clean a blind zone of the cleaning robot relative to the obstacle. As a result, the cleaning effect of the cleaning robot is significantly improved.

In the present disclosure, a blind zone means a gap or an area formed between the cleaning member 21 and the obstacle, which cannot be cleaned by the cleaning member 21 in an initial travelling direction of cleaning robot.

Specifically, the turning motions and the backswings of the rear end of the cleaning robot are implemented by controlling a driving device of the cleaning robot. For example, in some embodiments, two driving wheels 22 (as shown in FIGS. 3 to 5) are provided at the bottom rear end of the cleaning robot, and the rear end of the cleaning robot can be turned or swung back by controlling the two driving wheels 22.

The "cleaning member" in the present disclosure can be in various forms, as long as it can serve as a cleaner. For example, it can be a mop, a wiper, a roller brush, etc., which is not limited here. Optionally, the cleaning member 21 may be stationary relative to the cleaning robot, or may rotate or move relative to a chassis of the cleaning robot, which is not limited. In the examples shown in FIGS. 3, 6 and 7, the cleaning member 21 is a wiper that can rotate relative to the chassis of the cleaning robot. In the examples shown in FIGS. 4 and 5, the cleaning member is a mop attached to the chassis of the cleaning robot.

In addition to the "cleaning member," other modules of the cleaning robot in the present disclosure may also be in various forms. For example, in addition to the above-mentioned cleaning members, the cleaning robot may or may not be provided with other cleaning members. For example, as shown FIG. 3, a sweeper 23 is arranged at the front end of the cleaning robot. Optionally, the cleaning robot may have various overall shapes, as illustrated in FIG. 3 and FIG. 5 respectively showing different overall shapes but having the same function. It should be noted that any cleaning robot using the present cleaning method to clean a blind zone is covered by the scope of the present disclosure and claims.

In the present disclosure, "turning motion" refers to a motion made by a rear end of the cleaning robot with a preset turning angle relative to the initial travelling direction of the cleaning robot along an obstacle, so that a cleaning member 21 configured at the rear end of the cleaning robot can reach to and clean the blind zone that cannot be cleaned in the initial travelling direction of cleaning robot. It should be noted that, the "turning motion" in the present disclosure is not limited to that motion starting from the initial travelling direction of the cleaning robot along the obstacle, as long as the "turning motion" of the cleaning robot can result in covering and cleaning the blind zone. For example, when the cleaning robot starts a turning motion, the rear end of the cleaning robot can be turned to that side away from the obstacle relative to the initial travelling direction.

In the present disclosure, "travelling direction along the obstacle" refers to a normal travelling direction of the cleaning robot along an obstacle in a conventional manner, with a proper gap between the cleaning robot and the obstacle. During the cleaning process of the cleaning robot travelling along the obstacle, the gap or area formed between the cleaning member 21 and the obstacle forms a clean blind zone.

"Swinging back" or "backswings" in the present disclosure means that the rear end of the cleaning robot returns back from a previous turning position (a position at the end of a turning motion). It should be noted that the degree of backswing is not strictly limited, and the rear end of the cleaning robot can swing back to an initial travelling direction of the cleaning robot, or to another travelling direction that deviates from the initial travelling direction, such as a direction not yet reaching the initial travelling direction, or a direction beyond the initial travelling direction.

In some embodiments, the cleaning method further includes controlling a current cleaning zone cleaned in each current turning motion of the cleaning member 21 to be partially overlapped with or adjacent to a previous cleaning zone cleaned in a previous turning motion.

Note that, "a current cleaning zone cleaned in each current turning motion" means a part of the blind zone that is reached and covered by the cleaning member 21 due to the current turning motion.

Optionally, "adjacent" means abutted with one another, or spaced apart from one another.

In some embodiments, the cleaning method further includes driving the rear end of the cleaning robot to make the turning motions towards the obstacle if a constraint condition of travelling along the obstacle is satisfied, so as to ensure the cleaning of the blind zone by the cleaning member 21.

The "constraint condition of traveling along the obstacle" in the present disclosure is set for the cleaning robot to smoothly clean in the normal travelling direction along the obstacle so as to prevent the cleaning robot from deviating from the normal travelling direction. Once the cleaning robot does not meet that constraint condition, the position of the cleaning robot can be adjusted by turning or steering, etc., the cleaning robot so that the cleaning robot can return to the normal travelling direction. It is contemplated that, one or more constraint conditions may be set. When more than one constraint condition is set, at least one of the constraint conditions must be met to proceed with a turning motion. In addition, other constraint conditions may be further set to proceed with such a turning motion.

In an exemplary embodiment, the constraint condition of travelling along an obstacle includes that a distance between the cleaning robot and the obstacle satisfies a preset distance condition. That is to say, the rear end of the cleaning robot will make a turning motion towards the obstacle once the preset distance is fulfilled, to facilitate cleaning in the blind zone. Other constraint conditions may be set to trigger that turning motion.

Specifically, during the normal travelling of the cleaning robot, the distance between the cleaning robot and the obstacle may be detected in real time to determine if the preset distance condition is met or not. If the preset distance condition is not satisfied, the position of the cleaning robot will be adjusted by turning or steering, etc., so as to return to the normal travelling direction to ensure stable travel along the obstacle. For example, when the cleaning robot linearly travels along the obstacle (travels along a straight edge or wall), a substantially linear travelling may be ensured by setting a preset distance condition. Such a preset distance condition is also a preset distance condition that needs to be met for each turning motion of the rear end of the cleaning robot in the present disclosure.

In an exemplary embodiment, the preset distance condition is that distance between the cleaning robot and the obstacle detected in real time, which is equal to a preset distance threshold. In such a configuration, the cleaning of the blind zone is ensured.

Of course, the preset distance condition is not limited to the above exemplary embodiment. For example, the preset distance condition may also be that distance between the cleaning robot and the obstacle detected in real time, which falls within a preset distance interval having a relative small range.

In the present disclosure, the meaning of "the distance between the cleaning robot and the obstacle" is not limited specifically. For example, it can refer to a distance between a reference point and a point on the edge of the obstacle that corresponds to the normal of the edge of the obstacle, or a distance between two or more position points of the cleaning robot and a point on the edge of the obstacle that corresponds to the normal of the edge of the obstacle.

The acquisition method of the distance between the cleaning robot and the obstacle may vary for different cleaning robots. For example, Chinese patent applications CN201910008516.3 and CN201910008517.8 disclose specific examples of acquiring such distance.

In some embodiment, the cleaning method further includes driving the rear end of the cleaning robot to make the turning motions towards the obstacle in a preset turning angle, which is conducive to the cleaning robot performing cleaning, thereby facilitating the cleaning of the blind zone of the cleaning member 21.

In some embodiments, the cleaning method further includes driving the rear end of the cleaning robot to make the turning motions towards the obstacle when the cleaning robot stops travelling. In other words, when a condition required for turning is met, the cleaning robot will stop the original travelling, and then the rear end of the cleaning robot is driven to turn toward the obstacle with a preset turning angle. In such a way, a larger blind zone will be reached to improve the cleaning effect.

In an exemplary embodiment, a current cleaning zone cleaned by the cleaning member 21 in each current turning motion is partially overlapped with or adjacent to a previous cleaning zone in a previous backswing. In the present disclosure, the "cleaning zone cleaned in the turning motion" refers to the area covered by the cleaning member 21 when the turning motion is done; while the "cleaning zone cleaned in the backswing" refers to the area covered by the cleaning member 21 when the backswing is done. Specifically, the rear end of the cleaning robot swings back from a previous turning position (the position where the turning motion is done) in a state where the normal travelling of the cleaning robot is stopped. Since the turning motions and the backswings are triggered at the same position in a state where the normal traveling of the cleaning robot is stopped, it is therefore further conducive to reliable and effective cleaning.

After the rear end of the cleaning robot returns back, the cleaning robot will continue to travel and perform a next turning motion and a next backswing at a next pause location until the preset cleaning procedure is finished.

In this embodiment, although the turning motion of the rear end of the cleaning robot is made when the normal travelling is stopped, the backswings of the rear end of the cleaning robot may not be limited like that. For example, the backswings may also be made during the normal travelling process of the cleaning robot, that is, swinging back while travelling. Under this circumstance, the current movement of the cleaning robot includes a normal travelling movement and a backswing movement.

In addition, in other embodiments, the turning motion of the rear end of the cleaning robot may also be made during the normal travelling process of the cleaning robot, that is, turning while travelling. Under this circumstance, the current movement of the cleaning robot includes a normal travelling movement and a turning movement. In this case, the way of swinging back of the rear end of the cleaning robot is not limited either.

In some exemplary embodiments, the cleaning method of the present disclosure further includes driving the rear end of the cleaning robot to start the turning motion towards the obstacle, along an initial travelling direction of the cleaning robot along the obstacle; and driving the rear end of the cleaning robot to make the backswings to the initial travelling direction or a previous position. In such a way, the cleaning robot can rapidly perform a turning motion, a backswing or a travelling movement, which is beneficial to shorten the overall cleaning time along the obstacle.

In some exemplary embodiments, the turning motions and the backswings are made during continuous travelling of the cleaning robot. Therefore, the cleaning effect to the blind zone is improved, and the overall cleaning efficiency is improved accordingly.

Optionally, the cleaning robot travels in a wave style or a zigzag style.

Embodiment Two

Figure 6:
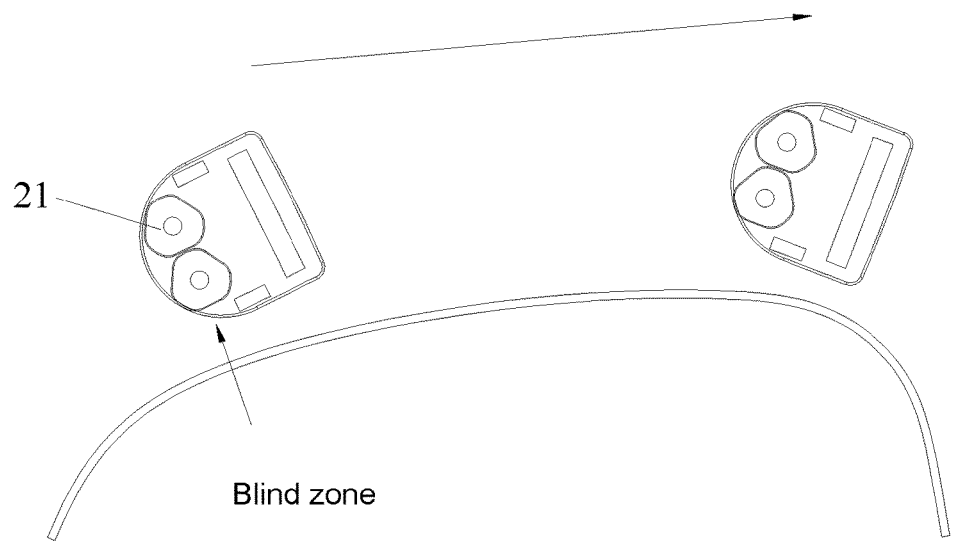
FIG. 6 is a schematic diagram showing that a cleaning robot nonlinearly travels along an obstacle according to an embodiment of the present disclosure.
Figure 7:
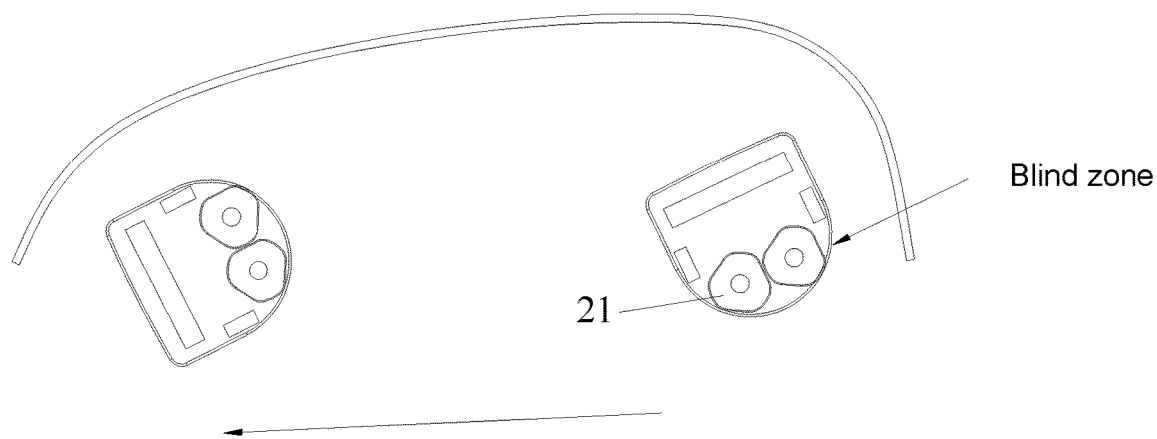
FIG. 7 is a schematic diagram showing that a cleaning robot nonlinearly travels along an obstacle according to another embodiment of the present disclosure.
Figure 8:
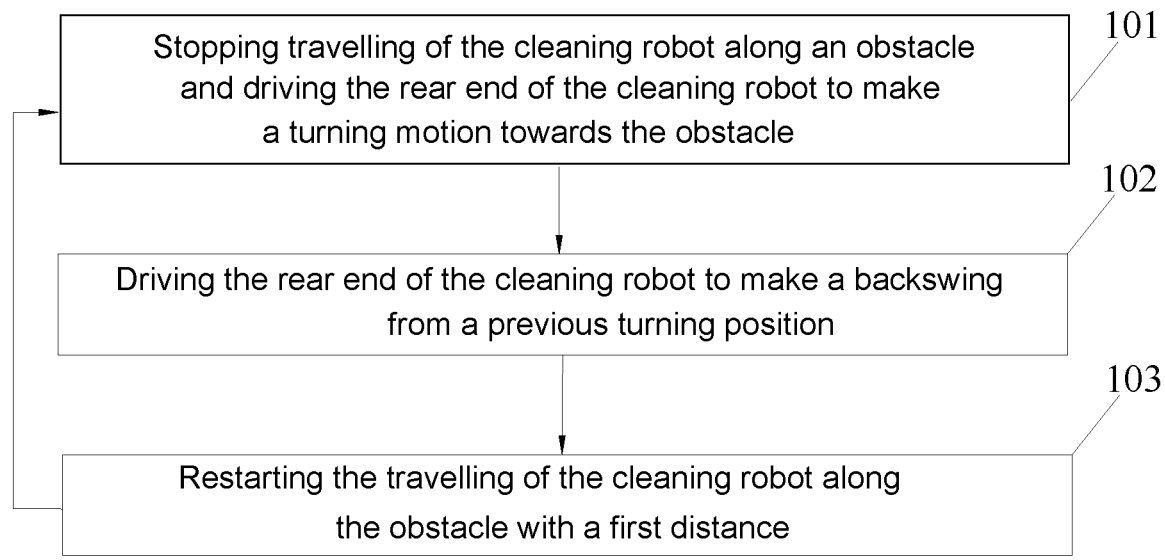
FIG. 8 is a flowchart of a cleaning method according to an embodiment of the present disclosure.

Referring to FIGS. 3 to 8, the present disclosure discloses a cleaning method of a cleaning robot, wherein the cleaning robot includes a cleaning member 21 arranged at a rear end of the cleaning robot. The cleaning method includes the following steps as shown in FIG. 8:

At step 101, stopping travel of the cleaning robot along an obstacle and driving the rear end of the cleaning robot to make a turning motion towards the obstacle. When the turning motion of the rear end of the cleaning robot is completed, that is, when the cleaning robot is in a turning position, the cleaning member 21 will be turned to a blind zone formed between the original position of the cleaning member 21 and the obstacle, so as to clean the blind zone. Since the turning motion of the rear end of the cleaning robot toward the obstacle is performed in a travel-stopped state, this can improve the cleaning effect of the cleaning member 21 on the blind zone.

At step 102, driving the rear end of the cleaning robot to make a backswing from a previous turning position. That is to say, when the cleaning robot swings back from the previous turning position, the cleaning robot is still in a travel-stopped state. In the absence of interference, the cleaning robot will normally return to the position at the beginning of the turning. Since the position at the beginning of the turning and the position at the end of the swinging back are the same, this can improve the cleaning effect of the cleaning member 21 on the blind zone and improve the cleaning efficiency.

At step 103, restarting the travelling of the cleaning robot along the obstacle with a first distance.

In some embodiments, the first distance is less than or equal to the cleaning width of the cleaning member 21 in the travelling direction along the obstacle when the cleaning robot stops. Depending on the cleaning member 21, the cleaning width may be different. For example, in FIG. 3, the cleaning width may be the range covered by the cleaning member 21 rotating along the travelling direction along the obstacle when the cleaning robot stops; in FIG. 4, the cleaning width may be the width of the cleaning member 21 itself; and when the cleaning member is a roller brush, the cleaning width may be the diameter of the roller brush.

Optionally, the travelling direction along the obstacle may be parallel or non-parallel to an outer contour of the obstacle.

The cleaning robot can repeat the above steps 101-103 until the cleaning operation along the obstacle in the current stage is completed or the current cleaning strategy is changed.

The rear end of the cleaning robot in the present disclosure can thus make a plurality of turning motions so that the cleaning member 21 can reach to and clean the blind zone, thereby solving the problem of cleaning blind zones when cleaning along obstacles, and improving the cleaning effect of the cleaning robot.

In some embodiments, the cleaning method of the present disclosure further includes controlling a current cleaning zone in each current turning motion to be partially overlapped with or adjacent to a previous cleaning zone in a previous turning motion, thereby facilitating the cleaning of the blind zone.

In the present disclosure, the cleaning zone that is covered by each turning motion of the cleaning member 21 can be adjacent to the previous cleaning zone covered in the previous turning motion, that is, both zones are closely next to each other. Of course, both zones may also be spaced apart.

Embodiment Three

Figure 9:
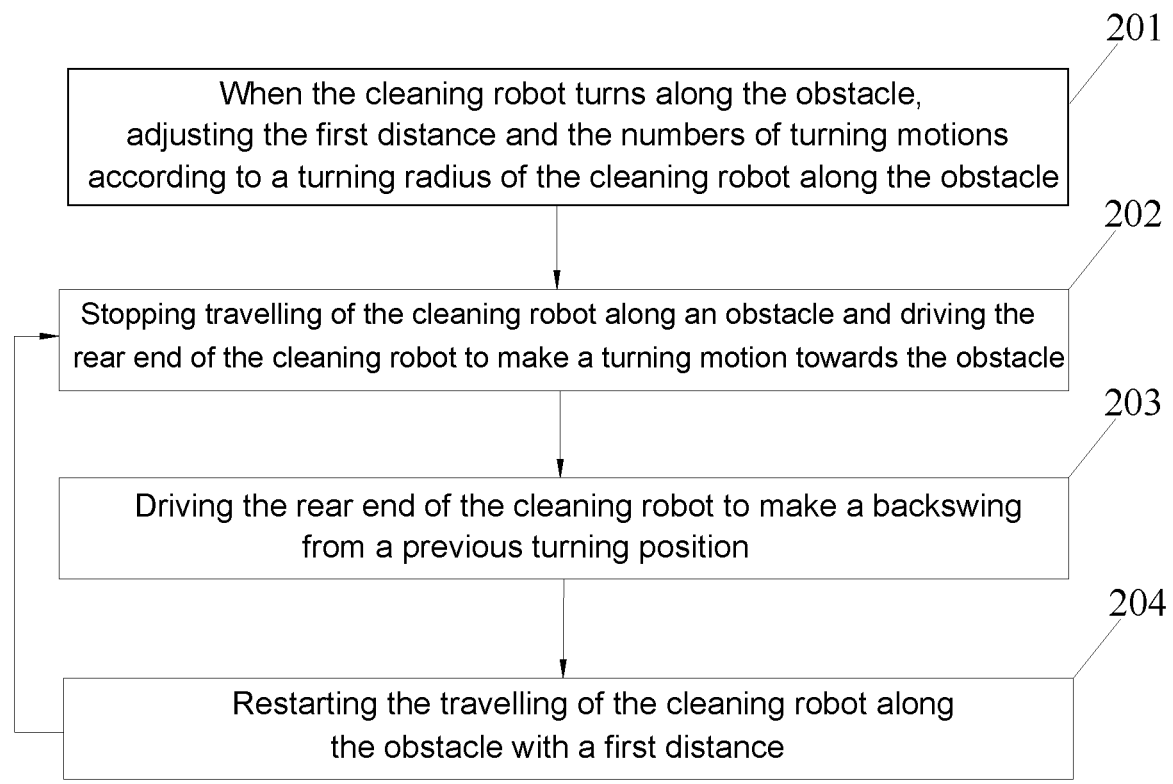
FIG. 9 is a flowchart of a cleaning method according to another embodiment of the present disclosure.

Referring to FIGS. 3-7 and FIG. 9, the present disclosure discloses a cleaning method of a cleaning robot, and the cleaning robot includes a cleaning member 21 arranged at a rear end of the cleaning robot. The cleaning method includes the following steps as shown in FIG. 9:

At step 201, when the cleaning robot turns along the obstacle (travels along a curved edge or wall), adjusting the first distance and the number of turning motions according to a turning radius of the cleaning robot along the obstacle. In this embodiment, the cleaning robot may set different turning radii to realize the turning along a curved edge or a curved wall of the obstacle.

FIG. 6 shows an example where the cleaning robot travels along an outer side of the obstacle (travels around the obstacle). If the turning radius of the cleaning robot when turning along the obstacle is smaller, the overlapping area between the current cleaning zone in each current turning motion and a previous cleaning zone in a previous backswing will be larger, and the distance the cleaning robot travels each time will be larger, accordingly, the number of turning motions and backswings will be reduced.

FIG. 7 shows an example where the cleaning robot travels along an inner side of the obstacle (an internal area surrounded by obstacle). If the turning radius of the cleaning robot when turning along the obstacle is smaller, the overlapping area between the current cleaning zone in each current turning motion and a previous cleaning zone in a previous backswing will be smaller, and the distance the cleaning robot travels each time will be smaller, accordingly, the number of turning motions and backswings will be increased.

At step 202, stopping travelling of the cleaning robot along an obstacle and driving the rear end of the cleaning robot to make a turning motion towards the obstacle.

At step 203, driving the rear end of the cleaning robot to make a backswing from a previous turning position.

At step 204, restarting the travelling of the cleaning robot along the obstacle with a first distance.

The cleaning robot can repeat the above steps 202-204 until the cleaning operation along the obstacle in the current stage is completed (preset turning motions are completed) or the current cleaning strategy is changed.

Optionally, the travelling direction along the obstacle may be parallel or non-parallel to an outer contour of the obstacle.

The rear end of the cleaning robot in the present disclosure can thus make a plurality of turning motions so that the cleaning member 21 can reach to and clean the blind zone, thereby solving the problem of cleaning blind zones when cleaning along obstacles, and improving the cleaning effect of the cleaning robot.

Embodiment Four

The present disclosure discloses a cleaning method of a cleaning robot, and the cleaning robot includes a cleaning member 21 arranged at a rear end of the cleaning robot. The cleaning method includes the following steps:

during a continuous travel of the cleaning robot along an obstacle, driving a rear end of the cleaning robot on which a cleaning member is arranged to make multiple turning motions towards the obstacle and multiple backswings away from the obstacle;

controlling a current cleaning zone in each current turning motion or each backswing to be partially overlapped with or adjacent to a previous cleaning zone in a previous turning motion or a previous backswing; and when each turning cleaning cycle is completed, controlling the cleaning robot to travel a second distance along the obstacle.

In some embodiments, the cleaning method further includes when the cleaning robot turns along the obstacle, adjusting the second distance and the number of turning motions according to a turning radius of the cleaning robot along the obstacle.

In some embodiments, the second distance is less than or equal to twice the cleaning width of the cleaning member 21 in the traveling direction of the obstacle. Specifically, the second distance is a displacement of the cleaning robot in the travelling direction when the cleaning robot completes a cycle of turning and backswing during the continuous travel.

Depending on the cleaning member 21, the cleaning width may be different. For example in FIG. 3, the cleaning width may be the range covered by the cleaning member 21 rotating along the travelling direction; in FIG. 4, the cleaning width may be the width of the cleaning member 21 itself; and when the cleaning member is a roller brush, the cleaning width may be the diameter of the roller brush.

In some embodiments, the cleaning robot can travel along an outer side of the obstacle (travels around the obstacle), and if the turning radius of the cleaning robot when turning along the obstacle is smaller, the overlapping area between the current cleaning zone in each current turning motion and a previous cleaning zone in a previous backswing will be larger, and the distance the cleaning robot travels each time will be larger. Accordingly, the number of turning motions and backswings will be reduced.

In some embodiments, the cleaning robot can travel along an inner side of the obstacle, and if the turning radius of the cleaning robot when turning along the obstacle is smaller, the overlapping area between the current cleaning zone in each current turning motion and a previous cleaning zone in a previous backswing will be smaller, and the distance the cleaning robot travels each time will be smaller. Accordingly, the number of turning motions and backswings will be increased.

The cleaning methods of the present disclosure in the above embodiments are only examples and should not be used to limit the present disclosure. When cleaning along the obstacle, any solution that drives the rear end of the cleaning robot to make turning motions and backswings toward the obstacle, thereby cleaning the blind area, shall fall within the scope of the present disclosure and the claims.

Embodiment Five

Figure 10:
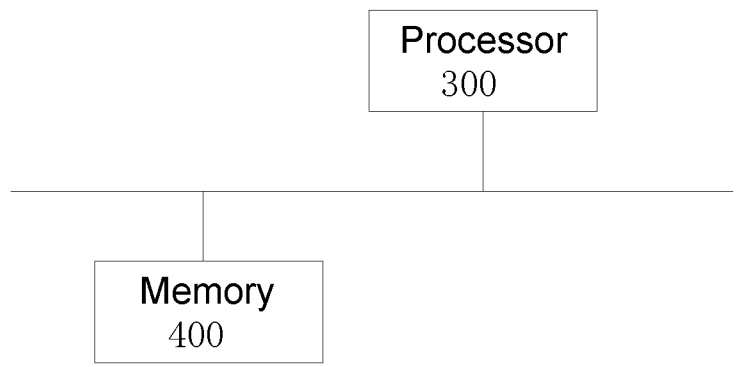
FIG. 10 is a schematic block diagram of a cleaning robot according to an embodiment of the present disclosure.

As shown in FIG. 10, a cleaning robot of the present embodiment includes a processor 300 and a memory 400, and the processor 300 is in communication with the memory 400, the memory 400 is configured to store instructions, and the processor 300 is configured to implement the cleaning methods described above by executing the instructions.

Embodiment Six

A computer readable storage medium of the present embodiment is adapted for a cleaning robot and is configured to store instructions, and the cleaning robot is configured to implement the cleaning methods described above by executing the instructions.

It should be noted that each embodiment of the present disclosure focuses on the differences from other embodiments, and does not describe the same or similar parts between various embodiments.

While the disclosure has been described in connection with what are presently considered to be the most practical embodiments, it is to be understood that the disclosure is not to be limited to the disclosed embodiments, but on the contrary, is intended to cover various modifications and equivalent arrangement included within the spirit and scope of the disclosure and the claims.

What is claimed is:

1. A method of cleaning using a cleaning robot, the cleaning robot including a mopping module arranged on a rear end of the cleaning robot and a brushing module arranged on a front end of the cleaning robot, the mopping module including a cleaning member having a mop, and, when traveling along an obstacle in an initial traveling direction, the cleaning robot having a blind zone formed between the cleaning member and the obstacle, the method comprising:
while the cleaning robot travels along the obstacle,
(1) driving the rear end of the cleaning robot to make a turning motion towards the obstacle; and
(2) driving the rear end of the cleaning robot to make a backswing away from the obstacle; and
while the cleaning robot stops travelling, driving the rear end of the cleaning robot to make the turning motion towards the obstacle.

2. The method of claim 1, further comprising:
repeating (1) and (2) for a plurality of times.

3. The method of claim 2, further comprising:
forming a cleaning zone, by the cleaning member, cleaned in each turning motion, the cleaning zone cleaned in each turning motion covering at least a portion of the blind zone; and
controlling each cleaning zone cleaned in each turning motion to be partially overlapped with or adjacent to a prior cleaning zone cleaned in a prior turning motion.

4. The method of claim 1, further comprising:
driving the rear end of the cleaning robot to make the turning motion towards the obstacle based on a constraint condition of traveling along the obstacle being satisfied.

5. The method of claim 4, wherein the constraint condition of traveling along the obstacle comprises: a distance between the cleaning robot and the obstacle detected being smaller than or equal to a preset distance threshold.

6. The method of claim 1, wherein driving the rear end of the cleaning robot to make the backswing away from the obstacle further comprising:
driving the rear end of the cleaning robot to make the backswing back to the initial travelling direction or a prior position before the turning motion.

7. The method of claim 1, further comprising:
repeating (1) and (2) for a plurality of times;
controlling each cleaning zone cleaned in each turning motion or in each backswing to be partially overlapped with or adjacent to a prior cleaning zone cleaned in a prior turning motion or in a prior backswing; and
upon each repetition of (1) and (2) being completed, controlling the cleaning robot to travel a first distance along the obstacle.

8. The method of claim 7, further comprising:
while the cleaning robot turns along the obstacle, adjusting the first distance and a number of turning motions according to a turning radius of the cleaning robot along the obstacle.

9. The method of claim 7, wherein as the turning radius of the cleaning robot traveling along the obstacle is reduced, increasing the first distance traveled by the cleaning robot, and reducing the number of turning motions.

10. The method of claim 7, wherein as the turning radius of the cleaning robot traveling along the obstacle is reduced, reducing the first distance traveled by the cleaning robot, and increasing the number of turning motions.

11. The method of claim 7, wherein the first distance is smaller than or equal to a width of a cleaning zone of the cleaning member along the obstacle when the cleaning robot stops moving.

12. The method of claim 1, wherein the blind zone is formed near the rear end of the cleaning robot and a side of the cleaning robot close to the obstacle.

13. The method of claim 1, further comprising driving the cleaning member to rotate relative to a chassis of the cleaning robot.

14. The method of claim 1, further comprising driving the cleaning robot to move in a wave style or a zigzag style.

15. The method of claim 1, further comprising upon each repetition of (1) and (2) being completed, controlling the cleaning robot to travel a second distance along the obstacle.

16. The method of claim 15, wherein the second distance is smaller than or equal to twice of a width of a cleaning zone of the cleaning member along the obstacle when the cleaning robot stops moving.

17. The method of claim 1, wherein driving the rear end of the cleaning robot to make the turning motion towards to the obstacle further comprising driving the rear end of the cleaning robot to turn a preset angle.

18. A cleaning robot, comprising:
a brushing module arranged on a front end of the cleaning robot;
a mopping module arranged on a rear end of the cleaning robot, the mopping module including a cleaning member having a mop, wherein, when traveling along an obstacle in an initial traveling direction, the cleaning robot has a blind zone formed between the cleaning member and the obstacle;
a processor; and
a memory coupled to the processor, the memory being configured to store computer-readable instructions, and the processor being configured to execute the computer-readable instructions to facilitate:
while the cleaning robot travels along the obstacle,
(1) driving the rear end of the cleaning robot to make a turning motion towards the obstacle; and
(2) driving the rear end of the cleaning robot to make a backswing away from the obstacle; and
while the cleaning robot stops travelling, driving the rear end of the cleaning robot to make the turning motion towards the obstacle.

19. A non-transitory computer readable storage medium, having computer-executable instructions stored thereon, the computer-executable instructions, when executed by one or more processors, causing the one or more processors to facilitate cleaning using a cleaning robot, wherein the cleaning robot includes a mopping module arranged on a rear end of the cleaning robot and a brushing module arranged on a front end of the cleaning robot, the mopping module includes a cleaning member having a mop, when traveling along an obstacle in an initial traveling direction, the cleaning robot has a blind zone formed between the cleaning member and the obstacle,
the computer-executable instructions causing the one or more processors to:
while the cleaning robot travels along the obstacle,
(1) cause the rear end of the cleaning robot to make a turning motion towards the obstacle; and
(2) cause the rear end of the cleaning robot to make a backswing away from the obstacle; and
while the cleaning robot stops travelling, driving the rear end of the cleaning robot to make the turning motion towards the obstacle.

* * * * *